United States Patent [19]

Thibault

[11] Patent Number: 5,077,067
[45] Date of Patent: Dec. 31, 1991

[54] PROCESS FOR THE SELECTIVE AND QUANTITATIVE ELIMINATION OF LACTOGLOBULINS FROM A STARTING MATERIAL CONTAINING WHEY PROTEINS

[75] Inventor: Philippe A. Thibault, Romainville Saint Agne, France

[73] Assignee: Union des Cooperatives Laitieres D'Isigny-Sur-Mer et de Sainte-Mere-Eglise, Isigny Sur-Mer, France

[21] Appl. No.: 524,924

[22] Filed: May 18, 1990

[30] Foreign Application Priority Data

May 19, 1989 [FR] France ................................ 89 06547

[51] Int. Cl.$^5$ ................................................ A23C 9/14
[52] U.S. Cl. .................................... 426/271; 210/669; 210/683
[58] Field of Search ....................... 426/271, 490, 491; 210/669, 683

[56] References Cited

U.S. PATENT DOCUMENTS 4,229,342 10/1980 Mirabel ........................... 426/271 X

FOREIGN PATENT DOCUMENTS 0285576 10/1988 European Pat. Off. .
2188526 10/1987 United Kingdom .

OTHER PUBLICATIONS

Lindsay, S., High Performance Liquid Chromatography, 1987, p. 204, John Wiley & Sons, Chichester.
Skudder, "Evaluation of a Porous Silica-Based Ion-Exchange Medium . . . " in J. Dairy Research, 59, vol. 1, pp. 167-181, 1985.
Barker et al., "Composition and Properties of Spherosil-QMA Whey Protein Concentrate" in J. Food Science, 51, No. 4, Jul.-Aug. 1986, pp. 919-923.

*Primary Examiner*—Donald E. Czaja
*Assistant Examiner*—Leslie Wood
*Attorney, Agent, or Firm*—Watson, Cole, Grindle & Watson

[57] ABSTRACT

A process for the selective and quantitative elimination of lactoglobulins from a starting material containing whey proteins, wherein the starting material is brought into contact with a strongly basic type anion exchanger, the pH of the starting material being between 4 and 6 when the ash content of the starting material is between 0 and at most 1% by weight, and between 6 and 8 when the ash content is between more than 1% and 3% by weight, so as to retain the lactoglobulins selectively and quantitatively on the anion exchanger, the anion exchanger on which the lactoglobulins are retained is separated from the remainder of the starting material and the remainder, free from lactoglobulins, is collected.

6 Claims, No Drawings

PROCESS FOR THE SELECTIVE AND QUANTITATIVE ELIMINATION OF LACTOGLOBULINS FROM A STARTING MATERIAL CONTAINING WHEY PROTEINS

BACKGROUND OF THE INVENTION

The invention relates to a process for the selective and quantitative elimination of lactoglobulins from a starting material containing whey proteins.

Dietary milk-based foods for infants are often manufactured from proteins extracted from cow's milk. In order to resemble human milk, a special formulation of the different ingredients of cow's milk is necessary and, exclusively from the standpoint of the proteins, it must be ensured that the aminogram (and especially the provision of essential amino acids such as threonine, tryptophan and lysine) is as close as possible to that of the proteins of human milk.

For this purpose, it is necessary, in particular, to shift the balance of the whey proteins/caseins ratio of cow's milk in favour of the whey proteins. The dietary milk-based feeds thereby obtained contain a high proportion of whey proteins. The following problem then arises: the protein fractions of human and bovine wheys do not have the same compositions; in particular, human whey does not contain beta-lactoglobulin, whereas approximately half the protein fraction of bovine whey is represented by beta-lactoglobulin. This difference in composition is the source of allergic phenomena in some infants when the latter are fed with milks of composition based on serum proteins of bovine origin. This allergy is manifested, in particular, in digestive disorders (abdominal pain, diarrhea, vomiting).

Several proposals have been made for solving this problem, employing, for example, thermal denaturation of the proteins, total hydrolysis of the proteins to very short peptides or quantitative elimination of the lactoglobulins.

Thermal denaturation of the proteins considerably impairs their digestibility.

Total hydrolysis of the proteins leads to production of preparations which then contain only peptides and are free from residual proteins. This hydrolysis may be carried out either chemically (by means of acid or base) or enzymatically. In the case of enzymatic hydrolysis, it is often necessary to use several proteases of complementary specificities (for example trypsin, chymotrypsin, pepsin, papain, bacterial proteases) in order to achieve the desired degree of hydrolysis; the quantities of enzymes to be used are often large. Whether the hydrolysis is chemical or enzymatic, residual proteins which are not digested because they are particularly resistant to hydrolysis (especially serum albumin and immunoglobulins) often remain in the preparations. If the recovery of only peptides is desired, these proteins must be eliminated by an additional treatment (precipitation/centrifugation, ultrafiltration).

The elimination of lactoglobulins from wheys has already been the subject of several studies. For example, the elimination of the lactoglobulins may be undertaken by exploiting the fact that lactoglobulins are still soluble under conditions in which all the other major whey proteins are not. A process is thus proposed by KUWATA et al (1985) (in J. Food Sci, V.50, N. 3; pp 605–609: Elimination of beta-lactoglobulin from whey to simulate human milk protein): ferric chloride is added to the whey and the pH is adjusted to 3; all the proteins precipitate with the exception of the lactoglobulins, the precipitate is recovered and the ferric ions are then eliminated either by ion exchange chromatography or by ultrafiltration. The protein concentrate obtained does not contain lactoglobulins. This process has the drawback of impairing the digestibility of the proteins thus precipitated.

Another process, studied by CHIANCONE and GATTONI (EP-A-285,576) exploits the property possessed by lactoglobulins of associating to dimers under certain conditions: lactoglobulins are immobilized on a support, and the whey from which it is desired to extract the lactoglobulins are passed through this support; the lactoglobulins are eliminated selectively by association the lactoglobulins of the support.

It may be noted that ion exchange resins of all types have already been used for the separation of whey proteins, but the object of the procedures adopted was separation of the collective proteins or enrichment in one type of protein, and these procedures could not lead to the selective extraction of lactoglobulins.

The following studies may be mentioned:

French Application for a Certificate of Addition No. 77/24,162 (Rhône-Poulenc):

Use in series of anion exchange resins and silicas to isolate the collective proteins of wheys.

French Patent No. 79/08,555 (BEL):

Use of one or more types of resins for separating the proteins of whey or obtaining fractions enriched in a particular protein. The procedure adopted comprise a special pretreatment and post-treatment of the starting material.

SUMMARY OF THE INVENTION

The object of the invention is to provide a process enabling the lactoglobulins to be extracted selectively and quantitatively from starting materials containing whey proteins, by retention of the lactoglobulins on an anion exchanger under suitable working conditions.

More especially, the invention relates to a process for the selective and quantitative elimination of lactoglobulins from a starting material containing whey proteins, characterized in that the starting material is brought into contact with a strongly basic type anion exchanger, the pH of the starting material being between 4 and 6 when the ash content of the starting material is between 0 and at most 1% by weight, and between 6 and 8 when the ash content is between more than 1% and 3% by weight, so as to retain the lactoglobulins selectively and quantitatively on the anion exchanger, the anion exchanger on which the lactoglobulins are retained is separated from the remainder of the starting material and the remainder, free from lactoglobulins, is collected.

The process of the invention enables all lactoglobulins to be retained selectively and a whey protein preparation free from lactoglobulins to be recovered in a single operation and with a single type of ion exchanger.

The elimination of lactoglobulins may be carried out directly from various starting materials, such as wheys of various origins: sour wheys (fresh pastes, casein manufacture), mild wheys (pressed pastes). These may be used as they are or previously delipidized and/or demineralized. Such wheys, concentrated (dry extract in the region of 20%) may also be adopted as a starting material.

Proteins extracted from the different wheys mentioned above may also be used as a starting material. These proteins may be obtained in a more or less purified state by various processes: ion exchange or gel filtration chromatography, precipitation, ultrafiltration. Of all these techniques, the most suitable since the most economic and the most widely employed industrially is ultrafiltration. Undenatured protein preparations containing 75 to 85% approximately of protein matter (relative to the dry extract) are thereby obtained. From these purified protein preparations (dry or hydrated), solutions preferably containing approximately 100 to 150 g of proteins per liter are produced.

The wheys or reconstituted protein preparations may be used as they are, or preferably after being previously clarified by centrifugation or by microfiltration.

Attention must be given to the microbiological quality of the starting materials; in effect, some working conditions (pH and temperature) are favourable to microbial growths which are undesirable as regards the quality of the finished product. This may hence lead to a prior pasteurization or sterilization operation being performed on the starting material.

In the process of the invention, a strongly basic type anion exchanger is used. The designation "strongly basic" is well known to the users of ion exchange resins and suffices to define them.

For the requirements of the invention, any strongly basic type anion exchanger is suitable. These exchangers usually bear quaternary amine functions. The following resins may be mentioned as non-limiting examples:

Those having a crosslinked agarose matrix, such as Q Sepharose ® marketed by PHARMACIA for protein separation.

Those having a crosslinked dextran matrix, such as QAE-Sephadex ® marketed by PHARMACIA for protein separation.

Those having a polystyrene matrix, such as the resins marketed by ROHM AND HASS chiefly for demineralization.

Those having a polyacrylic matrix, such as the resins marketed by ROHM AND HASS chiefly for demineralization.

In order to eliminate lactoglobulins selectively from the substance containing whey proteins, it is necessary to observe certain working conditions.

A decisive factor for performing the ion exchange operation well is, in particular, the ionic strength of the preparations to be treated.

To retain a protein on an anion exchanger, the latter has to bear a negative overall charge. For this purpose, the pH of the preparation must be above the isoelectric point of the protein.

However, this condition is not sufficient for the protein to be retained: in effect, the protein is in competition with the other ionic species present in the preparation (salts in particular), and this competition can preclude the binding of the protein to the exchanger, even if the protein bears a suitable overall charge.

If it is not desired to retain a protein on an anion exchanger, independently of the presence of other ionic species, the pH of the preparation must be adjusted to a value below or equal to the isoelectric point of the protein.

These are the phenomena exploited for retaining the lactoglobulins of whey protein preparations selectively.

As regards the major whey proteins, the effect of the pH of the preparation is manifested in the following manner:

pH below 4: all the proteins are positively charged and, accordingly, cannot be retained on an anion exchanger.

pH between 4 and 6: only the lactoglobulins are negatively charged, the other proteins are positively charged, but if the ionic strength is too high, the lactoglobulins will not be able to bind to the exchanger.

pH above 6: all the major whey proteins are negatively charged.

To retain the lactoglobulins on the anion exchanger, the following procedure must be adopted:

if the ionic strength (salt content) is high, the lactoglobulins must be highly charged in compensation; for this purpose, a relatively high pH (above 6) will be selected.

if the ionic strength is low, a pH below 6 but not below 4 will be selected.

The salt content of the starting materials containing whey proteins may be correlated with the ash content of these materials, and the following procedure will be adopted:

if the ash content of the starting materials to be treated is between 0 and 1% (0 and 10 g/l), as is the case with all native wheys, solutions of whey protein preparations purified by ultrafiltration and concentrated and demineralized wheys, the pH of the preparation to be treated will be adjusted to between 4 and 6.

if the ash content of the starting materials to be treated is between 1 and 3% (10 and 30 g/l), as is the case with all non-demineralized concentrated wheys, the pH of the preparation to be treated will be adjusted to between 6 and 8.

The quantity of starting material which can be brought into contact with the exchanger depends on its lactoglobulin concentration, on other characteristics of the starting material (dry extract, ash content) and the exchanger adopted.

It is preferable to saturate the exchanger with lactoglobulins; this makes it possible to "drive off" the other proteins which might possibly be bound, and to recover them quantitatively in the product which it is desired to use.

On the common strongly basic anion exchangers, it is generally possible to retain between 5 and 15 grams of lactoglobulins per liter of exchanger, which represents per liter of exchanger approximately 2 to 6 liters of a native whey or 0.5 to 1.5 liters of a whey concentrate, or 15 to 45 grams of a preparation of purified whey proteins on the basis of the dry extract.

Bringing the starting material to be treated into contact with the exchanger may be carried out according to procedures well known in this type of chromatography; there may be mentioned:

Mixing in a stirred bed,

Rapid recirculation on a column of exchanger,

Progression of the preparation to be treated in a column of exchanger.

In all cases, the operation may be carried out at room temperature (of the order of 20° C.) or in the cold (in order to avoid problems of bacterial contamination). A temperature rise serves no useful purpose.

Binding of the lactoglobulins to the exchanger is virtually instantaneous: a contact time (residence time) of a few minutes is sufficient.

At the end of the operation, the treated product is recovered either by simple filtration or by centrifugation, or at outflow from the column in the case of adoption of a fixed bed configuration.

The treated product may be used directly, or alternatively concentrated and/or dried beforehand in order to ensure that it is well preserved.

To be reused, the exchanger must undergo a number of operations: elution of the lactoglobulins and regeneration.

Periodically, cleaning procedures may also be applied.

For all these operations, protocols well known to users of ion exchangers will be employed. For example:

For elution: use of a solution of high ionic strength, for example 1M aqueous sodium chloride solution, or of a solution of high acidity (1M acetic acid).

For regeneration and cleaning: the procedures recommended by the suppliers will be employed.

In order to monitor the ion exchange operation, it is necessary to be able to assay the lactoglobulins readily. This may be carried out efficiently by FPLC (Fast Protein Liquid Chromatography) by gel permeation using, for example, separating columns packed with Superose® 6 or 12, marketed by PHARMACIA.

The eluted fractions are analysed by measurement of the optical density at 280 nm.

The different major whey proteins are well separated in 50 mM phosphate buffer, pH 7.0, and the presence or absence of lactoglobulins may be observed without difficulty.

The order of emergence of the major whey proteins is as follows (from the shortest retention time to the longest): lipoproteins, immunoglobulins, serum albumin, lactoglobulins, lactalbumin.

Another very effective method for monitoring the presence or absence of lactoglobulins is immunoassay. To perform this, it is necessary to have anti-lactoglobulin antibodies. Combination of the lactoglobulins and these antibodies leads to the formation of a precipitate which permits visualization of the presence of lactoglobulins.

The following non-limiting examples are given in order to illustrate the invention.

Examples 1 to 4 illustrate the application of the invention to different starting materials; Examples 5 and 6 illustrate the use of different types of ion exchangers.

EXAMPLES 1 TO 4

In these examples, the ion exchanger used is Q Sepharose® (Pharmacia). The starting materials treated and the working conditions are summarized in Table 1.

Bringing the exchanger and the preparation to be treated into contact is performed by mixing With moderate stirring at room temperature for 15 min. At the end of the operation, the treated preparation is separated from the exchanger by filtration on sintered glass. The exchanger is rinsed with water and the lactoglobulins are then eluted by rinsing using molar sodium chloride solution.

The exchanger is then rinsed with water and thereafter equilibrated using a 50 mM phosphate buffer for further use.

FPLC analysis shows that protein preparations obtained are free from lactoglobulins and that all the other major whey proteins are recovered quantitatively.

This observation is confirmed by the high purity of the lactoglobulin fraction recovered.

EXAMPLE 5

The pH of a native whey from casein manufacture is adjusted to 5.0 and a clarification is performed by centrifugation.

Two liter of the whey thus prepared are brought into contact with one liter of polystyrene type ion exchange resin (Duolite® A-101 marketed by Rohm and Hass) by rapid recirculation on a fixed bed of resins at room temperature for 30 min., and then separated from the resin.

The whey obtained is free from lactoglobulins and has retained all its other major proteins.

Elution of the lactoglobulins and regeneration of the resin are performed by rinsing the exchanger using two liters of normal hydrochloric acid solution.

The resin is then washed copiously with water for further use.

EXAMPLE 6

The pH of a native whey from casein manufacture is adjusted to 5.0 and a clarification is then performed by centrifugation. Six liters of whey, thus prepared are brought into contact with one liter of QAE-Sephadex® exchanger (Pharmacia) by moderate stirring at 20° C. for 15 minutes.

The treated preparation is then separated from the exchanger by filtration on sintered glass.

The whey obtained is free from lactoglobulins and has retained all its other major proteins.

The lactoglobulins are eluted using molar sodium chloride solution, and the exchanger gel is then equilibrated using a 50 mM phosphate buffer for further use.

TABLE 1

| | Starting material | (Examples 1 to 4) Treatment of the starting material before being brought into contact with the anion exchanger | Quantity treated (1/1 of exchanger) |
|---|---|---|---|
| Example 1 | Native whey from casein manufacture | Adjustment of the pH to 5.0 Clarification by centrifugation | 4 |
| Example 2 | Concentrated whey from pressed paste (22.6% of DE*) TNM** = 14.6% of the DE | Adjustment of the pH to 7.0 Clarification by centrifugation | 0.5 |
| Example 3 | Concentrated whey from pressed paste (21.3% of DE) TNM = 15.4% of the DE and demineralized (ash = 0.9% of the DE) | Adjustment of the pH to 5.0 Clarification by centrifugation | 1 |
| Example 4 | 10% solution in water of powdered whey proteins | Adjustment of the pH to 5.0 | 0.5 |

TABLE 1-continued (Examples 1 to 4)

| Starting material | Treatment of the starting material before being brought into contact with the anion exchanger | Quantity treated (1/1 of exchanger) |
|---|---|---|
| | purified to the extent of 75% by ultrafiltration | |

*DE = dry extract
**TNM = total nitrogenous matter

I claim:

1. Process for selectively and quantitatively removing lactoglobulins from a starting material containing whey proteins, which consists essentially of bringing said starting material into contact with a strongly basic type anion exchanger, the following quantity of starting material being brought into contact per liter of anion exchanger:

2 to 6 liters of native whey, or 0.5 to 1.5 liters of a whey concentrate, or 15 to 45 grams of a preparation of purified whey proteins on the basis of the dry extract, the pH of said starting material being between 4 and 6 when the ash content of said starting material is between 0 and at most 1% by weight, and between 6 and 8 when said ash content is between more than 1% and 3% by weight, so as to retain the lactoglobulins selectively and quantitatively on the anion exchanger; separating said anion exchanger on which said lactoglobulins are retained from the remainder of said starting material; and collecting said remainder, free from lactoglobulins.

2. Process according to claim 1, wherein said starting material is selected from the group consisting of native wheys, concentrated and demineralized wheys and solutions of whey protein preparations, and in that the pH of said material is between 4 and 6.

3. Process according to claim 1, wherein said starting material is a non-demineralized concentrated whey, and in that the pH of said material is between 6 and 8.

4. Process according to claim 2, wherein said starting material is clarified by centrifugation or microfiltration before being brought into contact with the anion exchanger.

5. Process according to claim 3, wherein said starting material is clarified by centrifugation or microfiltration before being brought into contact with the anion exchanger.

6. A process for treating a starting material which contains a plurality of whey proteins including lactoglobulins so as to selectively and quantitatively remove the lactoglobulins therefrom and provide a whey protein containing product which is free of lactoglobulins, said process consisting of the steps of:

(a) providing a starting material which is selected from the group consisting of native whey, whey concentrated and a preparation of purified whey proteins and which has a pH of 4 to 6 when the ash content of the starting material is between 0 and up to 1% by weight and 6 to 8 when the ash content is more than 12% and up to 3% by weight, said starting material containing a plurality of proteins including lactoglobulins, (b) contacting said starting material with a strongly basic anion exchanger so as to selectively and quantitatively retain the lactoglobulins in said starting material on said anion exchanger, the amount of starting material contacting said anion exchanger being 2 to 6 liters of starting material per liter of anion exchanger when the starting material is native whey, 0.5 to 1.5 liters of starting material per liter of anion exchanger when the starting material is whey concentrate, and 15 to 45 grams of the preparation of purified whey proteins (dry extract basis) per liter of anion exchanger when the starting material is a preparation of purified whey proteins, and (c) recovering the anion exchanger with retained lactoglobulins and a whey protein-containing product which is free of lactoglobulins.

* * * * *